March 6, 1928.
H. BENIT
1,661,991
REEL FOR CABLES
Filed April 14, 1927
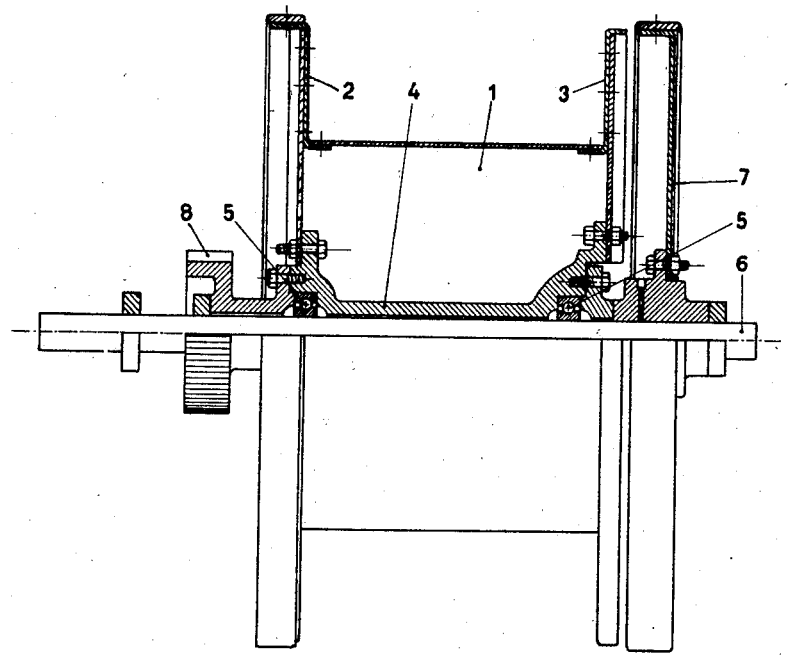
Henri Bénit   Inventor
By  Marion & Marion
Attorneys Patented Mar. 6, 1928.

1,661,991

UNITED STATES PATENT OFFICE.

HENRI BÉNIT, OF PARIS, FRANCE.

REEL FOR CABLES.

Application filed April 14, 1927, Serial No. 183,803, and in Germany May 3, 1926.

The present invention relates to reels for use in supporting coils of wire and cable of all kinds and also for use in the manufacture of these products as well as for transporting purposes.

The usual reels are formed of drums having very wide flanges integral therewith and are moved about by rolling them on the rims of such flanges. When such reels are heavily loaded they can be rolled in a straight line. As the flanges are fixed however, considerable force is required to roll them along a curve and to turn them round.

The present invention has for its object to avoid these disadvantages.

In accordance with the invention there is attached to the reel a free wheel independent of the drum so that the reel may be rolled on this wheel and on the opposite flange of the drum with the consequence that the two wheels may rotate at different speeds without slipping.

The above explanation will be rendered clearer by reference to the accompanying drawings which shows by way of example one embodiment of the invention, one half of the reel being shown in section and the other half in elevation.

In the embodiment illustrated 1 denotes the drum and 2 and 3 its flanges. These parts are made of sheet steel and are bolted to a cast hub 4. The latter is provided with two ball-bearings 5 the inner races of which are keyed on a central shaft 6. On the end of this shaft is keyed a wheel 7 the diameter of which is equal to that of the flange 2 and slightly greater than that of the flange 3. A toothed wheel 8 secured by screws to the hub 4 adjacent the flange 2 permits of the reel being rotated about its axis when the shaft is supported at its ends.

For transport purposes the reel is supported on the ground by the flange 2 and the free wheel 7.

It is obvious that a reel so constructed no matter how heavily weighted, can be moved easily over a curve and can even be turned about one or other of its wheels 2 or 7.

To prevent deviation of the reel from the straight when it is moved over a long distance in a straight line, as might occur owing to uni-lateral loading or due to the state of the ground over which it runs, means may be provided for securing the free wheel temporarily to the reel. There could be provided one or more pins which could be inserted at the desired moment in holes provided for this purpose in the flange 3 and in the wheel 7, or the reel might be provided with one or more devices located between these parts and adapted to wedge them together. The securing of these parts may of course be effected by means of a screw, a lever or other analogous means.

Having now particularly described and ascertained the nature of my said invention and in what manner the same is to be performed, I declare that what I claim is:—

A reel for supporting wires and cables and also for use in the manufacture of such articles as well as for transporting them, having a free wheel independent of the drum which permits of the reel being rotated on this wheel and on the opposite flange of the drum in such manner that said wheel and said flange may rotate at different speeds without slipping.

In witness whereof I have hereunto set my hand.

HENRI BÉNIT.